(12) United States Patent
Cheng et al.

(10) Patent No.: US 9,197,876 B2
(45) Date of Patent: Nov. 24, 2015

(54) FRAME RATE CONVERSION APPARATUS FOR 3D DISPLAY AND ASSOCIATED METHOD

(75) Inventors: Kun-Nan Cheng, Hsinchu Hsien (TW); Chit-Keng Huang, Hsinchu Hsien (TW); Yi-Chung Liao, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 908 days.

(21) Appl. No.: 12/868,831

(22) Filed: Aug. 26, 2010

(65) Prior Publication Data

US 2011/0050862 A1 Mar. 3, 2011

Related U.S. Application Data

(60) Provisional application No. 61/237,663, filed on Aug. 27, 2009.

(51) Int. Cl.
*H04N 13/00* (2006.01)

(52) U.S. Cl.
CPC ....... *H04N 13/0051* (2013.01); *H04N 13/0029* (2013.01)

(58) Field of Classification Search
CPC .................. H04N 13/0029; H04N 13/0051
USPC ........................................................ 348/51
See application file for complete search history.

(56) References Cited

U.S. PATENT DOCUMENTS

| 8,786,598 | B2 * | 7/2014 | Swan | 345/419 |
|---|---|---|---|---|
| 2002/0021261 | A1 * | 2/2002 | Werner | 345/8 |
| 2005/0046700 | A1 * | 3/2005 | Bracke | 348/218.1 |
| 2008/0204592 | A1 * | 8/2008 | Jia et al. | 348/402.1 |
| 2008/0303838 | A1 * | 12/2008 | Funakubo | 345/545 |
| 2010/0141741 | A1 * | 6/2010 | Choi | 348/51 |
| 2010/0156079 | A1 * | 6/2010 | Nakashima | 280/755 |
| 2010/0238274 | A1 * | 9/2010 | Kim et al. | 348/51 |

* cited by examiner

*Primary Examiner* — Anner Holder
(74) *Attorney, Agent, or Firm* — Edell, Shapiro & Finnan, LLC

(57) ABSTRACT

A frame rate conversion apparatus for 3D display is provided. The frame rate conversion apparatus for 3D display is capable of preserving alternate display of left and right frames while also preventing an issue of frame tearing. The frame rate conversion apparatus includes a storage unit, an input controller and an output controller. The input controller inputs an input frame sequence to the storage unit according to an input frame rate. The input frame sequence includes a plurality of frame pairs each having a left frame and a corresponding right frame. The output controller alternately outputs one of the left frames and one of the right frames from the storage unit according to an output frame rate and left/right frame information associated with the frame pairs in the storage unit to form an output frame sequence.

14 Claims, 5 Drawing Sheets

FRAME RATE CONVERSION APPARATUS FOR 3D DISPLAY AND ASSOCIATED METHOD

CROSS REFERENCE TO RELATED PATENT APPLICATION

This patent application claims the benefit of U.S. Provisional Patent Application No. 61/237,663 filed Aug. 27, 2009, the entirety of which is incorporated herein by reference.

FIELD OF THE INVENTION

The present invention relates to frame rate conversion, and more particularly, to a frame rate conversion apparatus for three-dimensional (3D) stereo display and associated method.

BACKGROUND OF THE INVENTION

To correctly display an image with a display device, a frame rate converter in the display device needs to first perform frame rate conversion supposing a frame rate from an image source is different from that of the display device. When the frame rate converter in the display device receives image frames from the image source, the frames are first stored to a plurality of built-in frame buffers, each provided for temporarily storing a frame, and are then outputted from the frame buffers to a display panel. The frame buffers function as a circular buffer. More specifically, supposing the display device comprises n frame buffers $buf_0$ to $buf_{n-1}$, the display device stores the image frames from the source to the buffers $buf_0$, $buf_1$ . . . and $buf_{n-1}$ in order, and again stores a next image frame to the frame buffer $buf_0$ after the frame buffer $buf_{n-1}$ to overwrite the frame previously stored in the frame buffer $buf_0$, thereby storing the image frames in a cyclical manner. In the event that the frame rate of the image source (to be referred to as the input frame rate) is different from the frame rate of the display device (to be referred to as the output frame rate), an issue of frame tearing may be incurred if an order of frame output follows frame input. For example, when the output frame rate is greater than the input frame rate, the output frames eventually "catch up" with the input frames if frames are outputted from the frame buffers by consistently following an order of the input frame buffers, such that a same frame is being simultaneously inputted to and outputted from a same frame buffer to result in frame tearing. On the other hand, when the output frame rate is less than the input frame rate, the above situation that the output frames catching up with the input frame is eliminated. However, since the frame buffers operate in a cyclic manner, if the frames are outputted by following the order of input frames, the issue of a same frame being simultaneously inputted to and outputted from a same frame buffer nevertheless occurs since the input frames catch up to the output frames.

To avoid the issue of frame tearing, a solution provided by the prior art is to output a frame by another frame buffer if a next predetermined frame buffer is inputting a frame, so as to prevent simultaneously inputting and outputting frames to and from a same frame buffer. Yet, when images provided by an image source are 3D images, other issues may arise when a frame rate converter adopts the foregoing prior solution although the issue of frame tearing is avoided.

Each 3D image is displayed by a frame pair, i.e., each image frame has a left frame and a corresponding right frame. From an image source that provides 3D images, a series of frame pairs are provided in order, with the left frames and right frames alternately presented. Further, in a typical approach, a left is presented before a right frame of a frame pair. However, when the foregoing prior solution for avoiding the issue of frame tearing is implemented for displaying 3D images, a failure of alternately displaying left and right frames may result, as shown in FIG. 1. In FIG. 1, suppose the output frame rate is greater than the input frame rate, the display device comprises four frame buffers $buf_0$ to $buf_3$, and the input frames are L1, R1, L2, R2, L3, R3, L4 . . . , with L1, L2 . . . being left frames, R1, R2 . . . being right frames, and (L1, R1), (L2, R2) . . . being frame pairs. The frame rate converter respectively inputs the frames L1, R1, L2, R2, L3, R3, L4, R4 . . . into the frame buffers $buf_0$, $buf_1$, $buf_2$, $buf_3$, $buf_0$, $buf_1$, $buf_2$, $buf_3$ . . . . Meanwhile, before the outputting the frames, the frame rate converter determines which frame buffer is being inputted (at time points indicated by arrows in FIG. 1) to avoid the frame buffer that is being inputted, and a frame buffer previously having been inputted is selected for output. As observed from FIG. 1, after outputting the frame R1, since the next frame L2 is still being inputted to the frame buffer $buf_2$ (at the time point indicated by an arrow 11), the frame buffer $buf_a$ previously having been inputted is selected to repeatedly output R1, such that an order of the outputted frames is L1, R1, R1, L2, R2, L3, R3 . . . —an order of alternating left and right frames is not maintained. Thus, display effects of 3D images are undesirably affected.

SUMMARY OF THE INVENTION

In view of the foregoing shortcomings associated with the prior art, it is an objective of the invention to provide a frame rate conversion apparatus and associated method applied in a 3D display, so that an order of alternately displaying left and right frames is preserved without causing an issue of frame tearing when a display device displays 3D images.

A frame rate conversion apparatus for 3D display according to the invention comprises: a storage unit; an input controller, for inputting an input frame sequence to the storage unit according to an input frame rate, the input frame sequence comprising a plurality of frame pairs each having a left frame and a corresponding right frame; and an output controller, for alternately outputting one of the left frames and one of the right frames from the storage unit according to an output frame rate and left/right frame information associated with the frame pairs in the storage unit to form an output frame sequence.

A frame rate conversion method for 3D display comprises: inputting an input frame sequence to a storage unit according to an input frame rate, the input frame sequence comprising a plurality of frame pairs each having a left frame and a corresponding right frame; and alternately outputting one of the left frames and one of the right frames from the storage unit according to an output frame rate and left/right frame information associated with the frame pairs in the storage unit to form an output frame sequence.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 2:
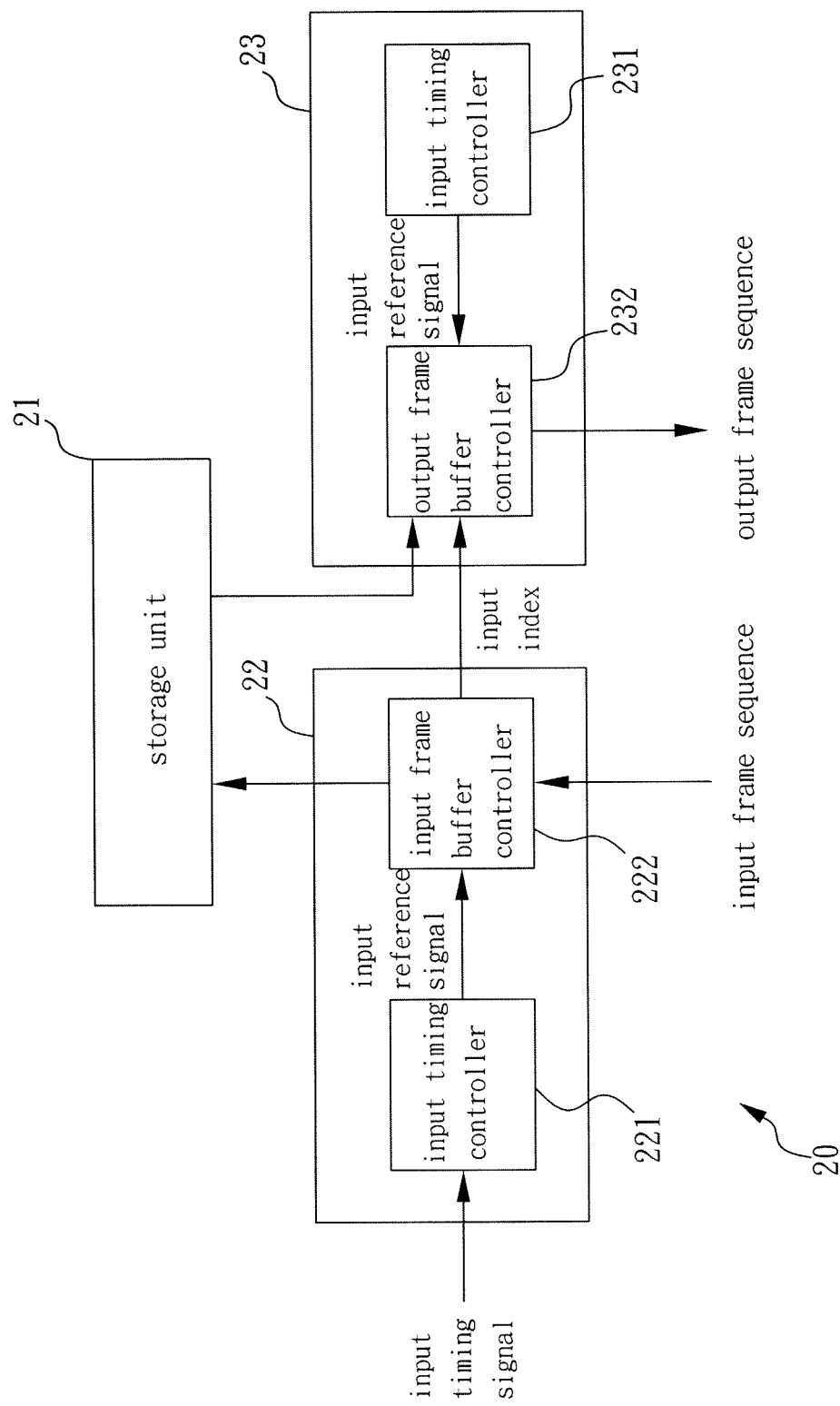
FIG. 2 is a block diagram of a frame rate conversion apparatus according to an embodiment of the invention.

FIG. 2 shows a block diagram of a frame rate conversion apparatus according to an embodiment of the invention. A frame rate conversion apparatus 20 comprises a storage unit 21, an input controller 22 and an output controller 23. The frame rate conversion apparatus 20 is applicable in a display device with 3D display capabilities. When a frame rate of a 3D image source is different from that of the display device, the frame rate conversion apparatus 20 converts the frame rate of the 3D image source to the frame rate of the display device, so as to allow the display device to normally display the 3D images. For example, the input controller 22 inputs an input frame sequence provided by the 3D image source according to the frame rate of the 3D image source to the storage unit 21. Being 3D images, the input frame sequence comprises a plurality of frame pairs each having a left frame and a right frame, which are alternately presented. The output controller 23 outputs an output frame sequence from the storage unit 21 according to the frame rate (the output frame rate) of the display device. In order to maintain display quality of the 3D images, the output frame sequence is formed by alternately outputting left and right frames to avoid the issue of successively outputting right frames or left frames as in the prior art. However, to operate in conjunction with recently popular 3D stereo glasses in the recent years, although the output frame sequence still alternately outputs left and right frames, two left frames (or right frames) may be successively outputted whenever outputting the left frame (or the right frame). For example, for an input frame sequence of {L1, R1, L2, R2 . . . }, where L1, L2 . . . are left frames and R1, R2 . . . are right frames, a corresponding output frame sequence is then {L1, L1, R1, R1, L2, L2, R2, R2 . . . }. Thus, the order of alternately displaying left and right frames is preserved while meeting operating requirements of 3D stereo glasses. A common application is that the input frame rate and the output frame rate are respectively 120 Hz and 240 Hz. It is appreciated from the above description that, for meeting operating requirements of 3D stereo glasses and taking a difference ratio between the input frame rate and the output frame rate, although the output frame sequence alternately outputs left and right frames, a left (or right) frame is successively outputted by a predetermined number of times every time the left (or right) frame is outputted. The predetermined number of times is dependent on the operating requirements of the 3D stereo glasses and the difference ratio between the input frame rate and the output frame rate.

The storage unit 21 comprises a plurality of frame buffers, each of which for storing a left frame or a right frame. The input controller 22 employs the frame buffers as a circular buffer for sequentially inputting and storing the frames of the input frame sequence. Further, to avoid the issue of frame tearing when the output frame rate differs from the input frame rate, the output controller 23 adopts a more flexible approach to output frames rather than outputting the frames by entirely following the input frame sequence. More specifically, when the output frame rate is greater than the input frame rate, to prevent the output controller 23 and the input controller 22 from outputting from and inputting to a same frame buffer, the frame previous having been outputted is repeatedly outputted, and a subsequent frame is then only outputted when the input controller 22 finishes inputting the subsequent frame. When the output frame rate is less than the input frame rate, the output controller 23 selectively outputs frames by skipping a certain frame or certain frames so that it is not caught up by the input controller 22. It is to be noted that, in this embodiment, whether certain frames are repeatedly outputted or skipped, it is necessary that the output controller 23 alternately outputs left and right frames according to left/right frame information associated with the frames in the storage unit 21, thereby upholding display quality of the 3D images.

In FIG. 2, the input controller 22 comprises an input timing controller 221 and an input frame buffer controller 222. The input timing controller 221 receives an input timing signal from the 3D image source, and generates an input reference signal that is transmitted to the frame buffer controller 222. For example, the input timing signal may be an input horizontal synchronization signal, an input vertical synchronization signal, or an input data enable signal. The input frame buffer controller 222 determines an input index representing a frame buffer to be inputted according to the input reference signal, and inputs the frame of the input frame sequence to the frame buffer corresponding to the input index. For example, the input timing controller 221 determines the frequency of the input frame rate and an input time point of the frames, and generates the input reference signal for indicating the time point. The input frame buffer controller 222 then dynamically adjusts the input index according to the time point indicated by the input reference signal. For example, when the input reference signal indicates that a next frame of the input frame sequence is to be inputted, the input frame buffer controller 222 adjusts the input index to a next frame buffer.

The output controller 23 comprises an output timing generator 231 and an output frame buffer controller 232. The output timing generator 231 generates an output timing signal satisfying specifications of the display device, and generates according to the output timing signal an output reference signal that is transmitted to the output frame buffer controller 232. For example, the output timing signal may be an output horizontal synchronization signal, an output vertical synchronization signal or an output data enable signal. The output frame buffer controller 232 can be aware left/right frame information corresponding to the frames from the storage unit 21 according to the input index generated by the input frame buffer controller 222. The output frame buffer controller 232 then determines an output index representing a frame buffer to be outputted according to the output reference signal and left/right frame information corresponding to the frames from the storage unit 21, and outputs the frame of the output frame sequence from a frame buffer corresponding to the output index. For example, the output timing controller 231 determines the frequency of the output frame rate and an output time point of the frames, and generates the output reference signal for indicating the time point. The output frame buffer controller 232 then dynamically adjusts the output index according to the time point indicated by the output reference signal and the input index from the input frame buffer controller 222, so as to prevent simultaneously outputting a frame while the input frame buffer controller 222 is inputting the same frame.

In the description below, when generating the output frame sequence, in order to prevent the output controller 23 and the input controller 22 from outputting from and inputting to a same frame buffer, how the output controller 23 appropriately selects a next frame buffer for outputting a right (or left) frame after outputting a left (or right) frame from a certain frame buffer is explained. In a preferred embodiment, the output controller 23, after outputting a left frame, selects a frame buffer that has been previously inputted with a right frame by the input controller 22 to output the right frame. For example, the output controller 23 selects a frame buffer to which the input controller 22 most recently finishes inputting a right frame to output the right frame. After outputting a right frame, the output controller 23 selects a frame buffer that has been previously inputted with a left frame by the input controller 22 to output the left frame. For example, the output controller 23 selects a frame buffer to which the input controller 22 most recently finishes inputting a left frame to output the left frame. Supposing the storage unit 21 comprises four frame buffers $buf_0$ to $buf_3$, and the input frame sequence is {L1, R1, L2, R2, L3, R3, L4 . . . }, with L1, L2 . . . being left frames, R1, R2 . . . being right frames, and (L1, R1), (L2, R2) . . . being frame pairs. That is, in the input frame sequence, a left frame is before a right frame within a same frame pair. Since the left and right frames of the input frame sequence are inputted to the frame buffers $buf_0$ to $buf_3$ of the storage unit 21 by following a predetermined order, the output controller 23 is allowed to determine left and right frame information corresponding to time points of the frame buffers $buf_0$ to $buf_3$ according to the predetermined input order of the input frame sequence.

Two situations, namely the output frame rate being greater than the input frame rate and the output frame rate being smaller than the input frame rate, are described below.

Figure 1:
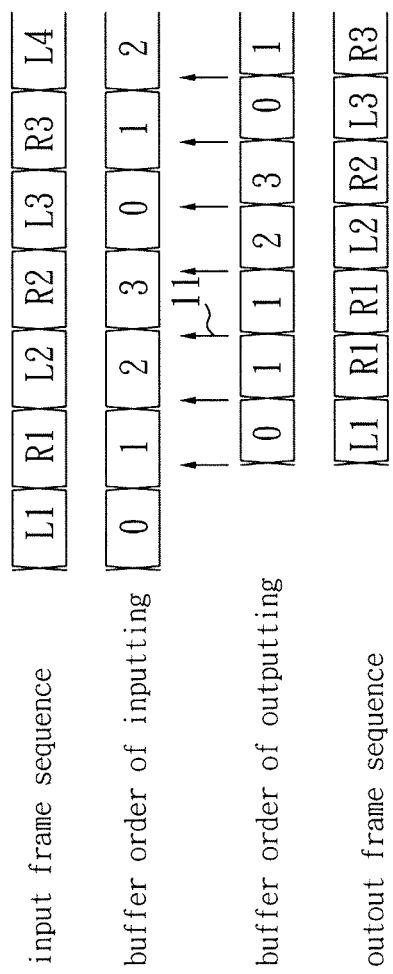
FIG. 1 is a schematic diagram illustrating the prior art that is unable to preserve alternate display of left and right frames.
Figure 3:
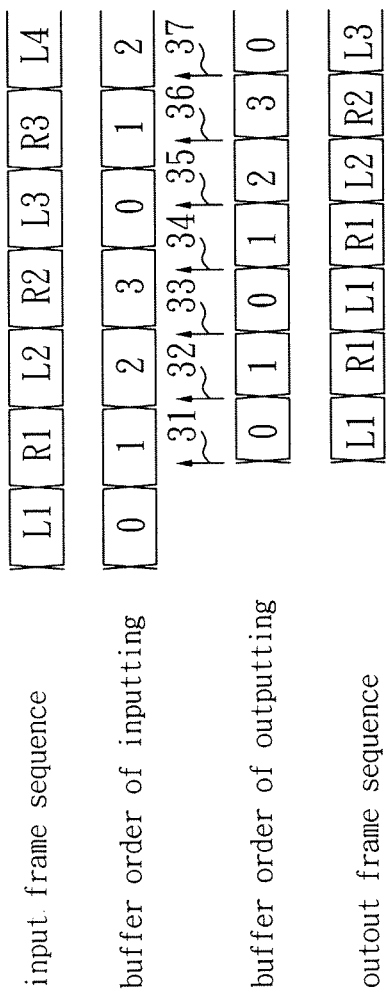
FIG. 3 is a schematic diagram illustrating how the frame rate conversion apparatus in FIG. 2 preserves alternate display of left and right frame when an output frame rate is greater than an input frame rate.

The first situation where the output frame rate is greater than the input frame rate is discussed next. The input controller 22 inputs the frames L1, R1, L2, R2, L3, R3, L4 . . . of the input frame sequence to the frame buffers $buf_0$ to $buf_3$, with the frame buffer $buf_0$ being iterated after the frame buffer $buf_3$. When outputting frames, after the left frame L1 is inputted to the frame buffer $buf_0$ (i.e., it is inferred that the inputting to the frame buffer $buf_0$ is completed by determining the frame buffer $buf_f$ is currently being inputted at a time point indicated by an arrow 31), the output controller 23 starts to output the frame L1 from the frame buffer $buf_0$. After each left frame is outputted, it is determined which frame buffer is being inputted (at time points indicated by arrows 32 to 37) to avoid the currently being inputted frame buffer, and a frame buffer to which the input controller 22 most recently finishes inputting a right frame is selected to output the right frame, so as to ensure that the left and right frames are alternately outputted. It is observed from a time point indicated by the arrow 33, after the output controller 23 outputs the right frame R1 from the frame buffer $buf_f$, supposedly the left frame L2 is to be next outputted. However, at this point, the frame buffer $buf_2$ is still inputting the frame L2, and thus the output controller 23 selects a frame buffer to which a left frame is most recently inputted, i.e., the frame buffer $buf_0$ that is inputted with the frame L1, to repeatedly output the frame L1. At the point when the frame L1 is repeatedly outputted, although the frame L2 is inputted to the frame buffer $buf_2$ (at the time point indicated by the arrow 34), the frame buffer $buf_f$ (the frame buffer to which a right frame is mostly recently inputted) is again selected to repeatedly output the frame R1, so as to alternately output left and right frames. Therefore, a final output frame sequence is L1, R1, L1, R1, L2, R2, L3 . . . . Comparing FIG. 1 and FIG. 3, it is apparent that the invention is capable of preserving alternate display of left and right frames while also preventing the issue of the frame tearing.

Figure 4:
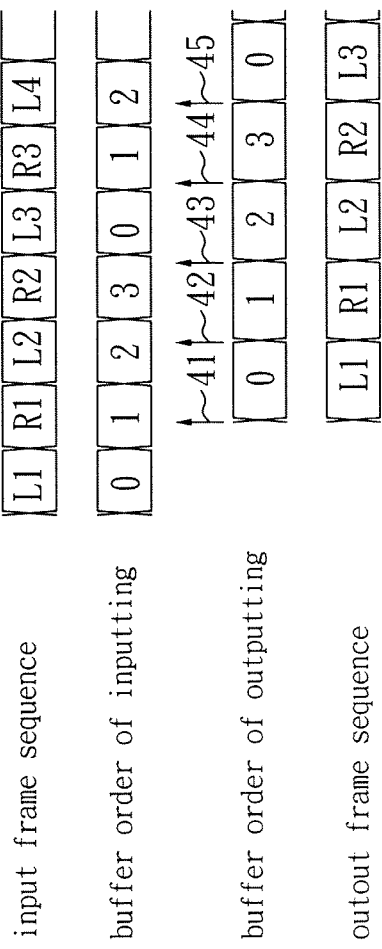
FIG. 4 is a schematic diagram illustrating how the frame rate conversion apparatus in FIG. 2 preserves alternate display of left and right frame when an output frame rate is less than an input frame rate.

The second situation where the output frame rate is less than the input frame rate is hereby discussed. Similar to the first situation, the input controller 22 cyclically inputs the frames of input frame sequence to the frame buffers $buf_0$ to $buf_3$, as shown in FIG. 4. When outputting frames, after the left frame L1 is inputted to the frame buffer $buf_0$ (at a time point indicated by an arrow 41), the output controller 23 starts to output the frame L1 from the frame buffer $buf_0$. Similar to the first situation, after each left (or right) frame is outputted, it is determined which frame buffer is being inputted (at time points indicated by arrows 42 to 47) to avoid the currently being inputted frame buffer, and a frame buffer to which the input controller 22 most recently finishes inputting a right frame is selected to output the right frame. It is observed from a time point indicated by the arrow 44, after the output controller 23 outputs the left frame L2 from the frame buffer $buf_2$, although the left frame L3 is inputted to the frame buffer $buf_0$ (i.e., the frame buffer $buf_0$ is a frame buffer to which a frame is mostly inputted for both left and right sides), the output controller 23 nevertheless selects a frame buffer to which a right frame is most recently inputted to preserve alternate display of left and right frames. Thus, a frame buffer $buf_3$ that is most recently inputted with a right frame, i.e., the frame buffer $buf_3$ that is inputted with the right frame L2, is selected to repeatedly output the right frame R2. In the above situation, the solution of the prior art may select the frame buffer $buf_0$ to output the left frame L3, thereby disturbing the order of alternately displaying the left and right frames.

In the foregoing embodiment, the ratio of the input frame rate to the output frame rate is not limited to an integral multiple—the frame rate conversion apparatus of the invention is also applicable to situations where a ratio of the input frame rate to the output frame rate is a fractional multiple.

In an input frame sequence, for adapting to a frame pair with a right frame presented before a left frame, the left frames and the right frames in the above embodiments are swapped, and other details are apparent to a person skilled in the art and shall not again be described for brevity.

Further, when an output frame rate is greater than an input rate and an input frame sequence is 3D stereo video, if motion interpolation for a corresponding output frame sequence is desired to enhance smoothness of the video, left and right frames generated from motion interpolation can be alternately displayed according to the above embodiment to enhance image effects of the 3D stereo video.

Figure 5:
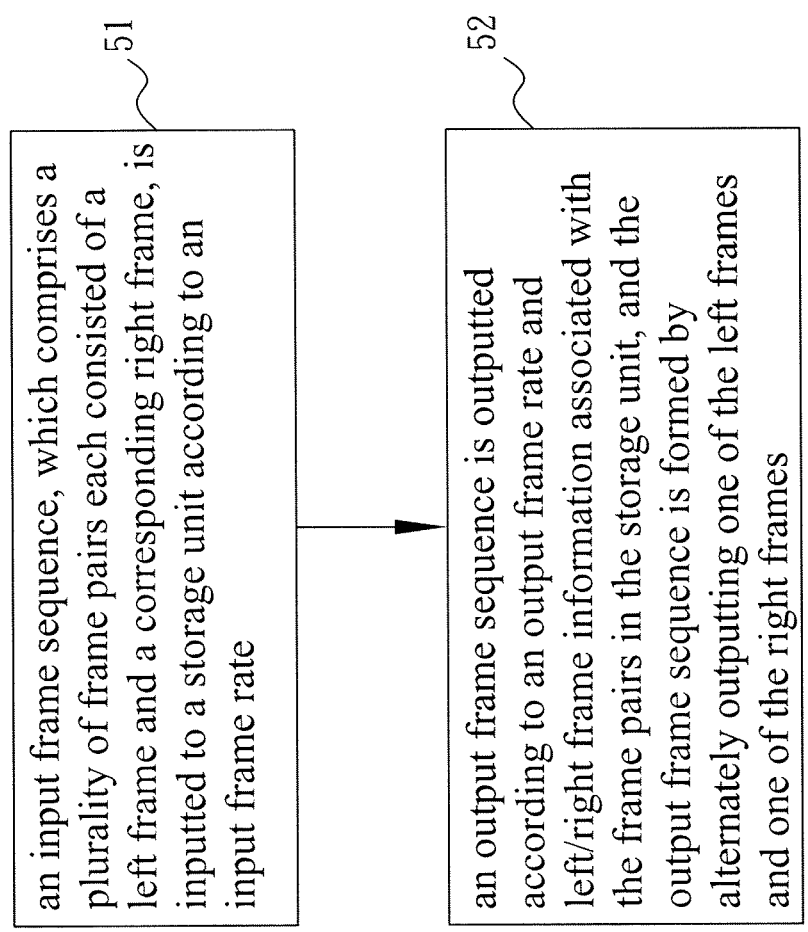
FIG. 5 is a flowchart of a frame rate conversion method according to an embodiment of the invention.

FIG. 5 shows a flowchart of a frame rate conversion method applied to a display device for 3D display according to one embodiment of the invention. In Step 51, an input frame sequence is inputted to a storage unit according to an input frame rate. The input frame sequence comprises a plurality of frame pairs each having a left frame and a corresponding right frame. In Step 52, an output frame sequence is outputted from the storage unit according to an output frame rate and left/right frame information corresponding to the frames in the storage unit. The output frame sequence is formed by alternately outputting one of the left frames and one of the right frames.

In a preferred embodiment, the storage unit comprises a plurality of frame buffers, each provided for storing one of the left frames or one of the right frames. In Step 51, the frame buffers, serving as a circular buffer, are inputted in order with the frames of the input frame sequence. In Step 52, after outputting one of the left frames, a frame buffer to which one of the right frames is inputted in Step 51, e.g., a frame buffer to which a right frame is inputted in Step 51, is selected for output. After outputting one of the right frames, a frame buffer to which one of the left frames is inputted in Step 51, e.g., a frame buffer to which a left frame is inputted in Step 51, is selected for output. Thus, it is prevented that Step 51 and Step 52 simultaneously input and output a same frame buffer while preserving alternate display of left and right frames.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A frame rate conversion apparatus for three-dimensional (3D) stereo display, comprising:
    a storage unit;
    an input controller, for inputting an input frame sequence to the storage unit according to an input frame rate, the input frame sequence comprising a plurality of frame pairs each having a left frame and a corresponding right frame; and
    an output controller, for alternately outputting one of the left frames and one of the right frames from the storage unit according to an output frame rate and left/right frame information associated with the frame pairs in the storage unit to form an output frame sequence,
    wherein the output controller successively outputs one of the left frames a predetermined number of times when outputting the one of the left frames, and successively outputs one of the right frames the predetermined number of times when outputting the one of the right frames,
    wherein the output controller and the input controller do not simultaneously output from and input to a same frame buffer,
    wherein the output controller selects a frame buffer to which one of the right frames has been most recently inputted by the input controller to output after outputting one of the left frames,
    wherein the output controller selects a frame buffer to which one of the left frames has been most recently inputted by the input controller to output after outputting one of the right frames, and
    wherein alternately outputting one of the left frames and one of the right frames from the storage unit comprises selectively skipping at least one frame of the input frame sequence.

2. The frame rate conversion apparatus as claimed in claim 1, wherein the storage unit comprises a plurality of frame buffers, each of which for storing one of the left frames or one of the right frames.

3. The frame rate conversion apparatus as claimed in claim 2, wherein the output controller utilizes the frame buffers as a circular buffer that is in order inputted with the input frame sequence.

4. The frame rate conversion apparatus as claimed in claim 3, wherein the output controller selects a frame buffer to which one of the right frames has been inputted by the input controller to output after outputting one of the left frames.

5. The frame rate conversion apparatus as claimed in claim 3, wherein the output controller selects a frame buffer to which one of the left frames has been inputted by the input controller to output after outputting one of the right frames.

6. The frame rate conversion apparatus as claimed in claim 1, wherein a ratio of the input frame rate to the output frame rate is a fractional multiple.

7. A frame rate conversion method for three-dimensional stereo display, comprising:
    inputting an input frame sequence to a storage unit according to an input frame rate, the input frame sequence comprising a plurality of frame pairs each having a left frame and a corresponding right frame; and
    alternately outputting one of the left frames and one of the right frames from the storage unit according to an output frame rate and left/right frame information associated with the frame pairs in the storage unit to form an output frame sequence,
    wherein the outputting step successively outputs one of the left frames a predetermined number of times when outputting the one of the left frames, and successively outputs one of the right frames the predetermined number of times when outputting the one of the right frames
    wherein the inputting step and the outputting step do not simultaneously input to and output from a same frame buffer,
    wherein the outputting step selects a frame buffer to which one of the right frames has been most recently inputted to output after outputting one of the left frames,
    wherein the outputting step selects a frame buffer to which one of the left frames has been most recently inputted to output after outputting one of the right frames, and
    wherein alternately outputting one of the left frames and one of the right frames from the storage unit comprises selectively skipping at least one frame of the input frame sequence.

8. The frame rate conversion method as claimed in claim 7, wherein the storage unit comprises a plurality of frame buffers, each of which for storing one of the left frames or one of the right frames.

9. The frame rate conversion method as claimed in claim 8, wherein in the inputting step, the frame buffers are utilized as a circular buffer for in order inputting the input frame sequence.

10. The frame rate conversion method as claimed in claim 9, wherein the outputting step selects a frame buffer to which one of the right frames has been inputted to output after outputting one of the left frames.

11. The frame rate conversion method as claimed in claim 9, wherein the outputting step selects a frame buffer to which one of the left frames has been inputted to output after outputting one of the right frames.

12. The frame rate conversion method as claimed in claim 7, wherein a ratio of the input frame rate to the output frame rate is a fractional multiple.

13. The frame rate conversion apparatus as claimed in claim 1, wherein the output controller alternately outputs in response to an input timing signal received from an image source and an output timing signal determined by a display device.

14. The frame rate conversion method as claimed in claim 7, wherein alternately outputting comprises alternately outputting in response to an input timing signal received from an image source and an output timing signal determined by a display device.

* * * * *